US012126865B1

(12) United States Patent
Ridgill et al.

(10) Patent No.: US 12,126,865 B1
(45) Date of Patent: Oct. 22, 2024

(54) USER ENGAGEMENT ASSESSMENT DURING MULTIMEDIA PLAYBACK

(71) Applicant: International Business Machines Corporation, Armonk, NY (US)

(72) Inventors: Steve Ridgill, Raleigh, NC (US); Jake Edward Bukuts, Raleigh, NC (US); Randy A. Rendahl, Raleigh, NC (US); Karsten Joachim Rabe, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 18/344,239

(22) Filed: Jun. 29, 2023

(51) Int. Cl.
*H04N 21/442* (2011.01)
*H04N 21/45* (2011.01)

(52) U.S. Cl.
CPC ... *H04N 21/44218* (2013.01); *H04N 21/4532* (2013.01)

(58) Field of Classification Search
CPC .............. H04N 21/44218; H04N 21/4532
See application file for complete search history.

(56) References Cited

U.S. PATENT DOCUMENTS

| | | | |
|---|---|---|---|
| 10,956,933 B2 | 3/2021 | Greenzeiger | |
| 11,199,899 B2 | 12/2021 | Ghajar | |
| 11,249,544 B2 | 2/2022 | Sicconi | |
| 2013/0205314 A1* | 8/2013 | Ramaswamy | ......... H04N 21/24 |
| 2017/0105051 A1 | 4/2017 | Deo | |
| 2018/0268439 A1 | 9/2018 | Avegliano | |
| 2019/0387277 A1 | 12/2019 | Oren | |

OTHER PUBLICATIONS

"Content delivery adjusted based on user attention", An IP.com Prior Art Database Technical Disclosure, IP.com No. IPCOM000256336D, IP.com Electronic Publication Date: Nov. 20, 2018, 7 pps.
"Online Eye Tracking Software", GazeRecorder, Webcam Eye Tracking, Copyright GazeRecorder © All rights reserved., 14 pps, Printed from the Internet on Apr. 19, 2023, <https://gazerecorder.com/>.

(Continued)

*Primary Examiner* — Anthony Bantamoi
(74) *Attorney, Agent, or Firm* — Aaron N. Pontikos

(57) ABSTRACT

Provided is a method, system, and computer program product for assessing user engagement during playback of multimedia content. A processor may analyze user audio engagement during playback of audio content of the multimedia content. The analyzing may be based on comparing a distance of a user from a speaker transmitting the audio content and comparing the distance of the user from the speaker transmitting the audio content to a volume setting of the speaker. The processor may analyze user video engagement during playback of video content of the multimedia content. The analyzing may be based on using eye-tracking software to compare a particular video content the user is actively viewing to the audio content being presented. The processor may generate a user engagement score during the playback of the multimedia content based on a time averaged value for each metric analyzed during playback of the audio content and video content.

20 Claims, 5 Drawing Sheets

(56) References Cited

OTHER PUBLICATIONS

Das, "Top 14 Proctoring Software to Secure Your Online Exams/Tests", Geekflare, Last updated: Nov. 25, 2022, 18 pps., <https://geekflare.com/exam-proctoring-software/>.

Dawson, "Eye Tracking: What Is It for and When to Use It", © Copyright 2011-2021 UsabilityGeek, 11 pps., <https://usabilitygeek.com/what-is-eye-tracking-when-to-use-it/>.

Dunhill, "Eye-Tracking MoviePass App Will Pause Ads If You Look Away", Feb. 15, 2022, 13 pps., <https://www.iflscience.com/eyetracking-moviepass-app-will-pause-ads-if-you-look-away-62635>.

Farnsworth, "10 Most Used Eye Tracking Metrics and Terms", Jun. 28, 2022, Learning, <https://imotions.com/ blog/learning/10-terms-metrics-eye-tracking/>.

Kane, "The Attention Economy", Jun. 30, 2019, Copyright © 1998-2023 Nielsen Norman Group, 9 pps., <https://www.nngroup.com/articles/attention-economy/>.

\* cited by examiner

USER ENGAGEMENT ASSESSMENT DURING MULTIMEDIA PLAYBACK

BACKGROUND

The present disclosure relates generally to the field of multimedia playback systems and, more specifically, to assessing user engagement during playback of multimedia content by tracking various audio, visual, and textual metrics to generate a user engagement score.

Users of online multimedia services are frequently asked to view an advertisement or read and agree to terms and conditions before they are allowed to use the service. Similarly, corporations may require employees to view training videos (e.g., business conduct guidelines, standard operating procedures, etc.) to remain in compliance with company standards. Unfortunately, ensuring that the required multimedia content that has been presented to the user(s) has been adequately viewed and understood is a difficult task. Users can easily sidestep the intent of this requirement by diverting their attention elsewhere rather than viewing and/or absorbing the multimedia content (e.g., advertisement, document, training video, etc.) as required.

SUMMARY

Embodiments of the present disclosure include a computer-implemented method, system, and computer program product for assessing user engagement during playback of multimedia content. A processor may analyze user audio engagement during playback of audio content of the multimedia content. The analyzing may be based, at least in part, on comparing a distance of a user from a speaker transmitting the audio content and comparing the distance of the user from the speaker transmitting the audio content to a volume setting of the speaker. The processor may analyze user video engagement during playback of video content of the multimedia content. The analyzing may be based, at least in part, on using eye-tracking software to compare a particular video content the user is actively viewing to the audio content being presented. The processor may generate a user engagement score during the playback of the multimedia content based on a time averaged value for each metric analyzed during playback of the audio content and video content.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
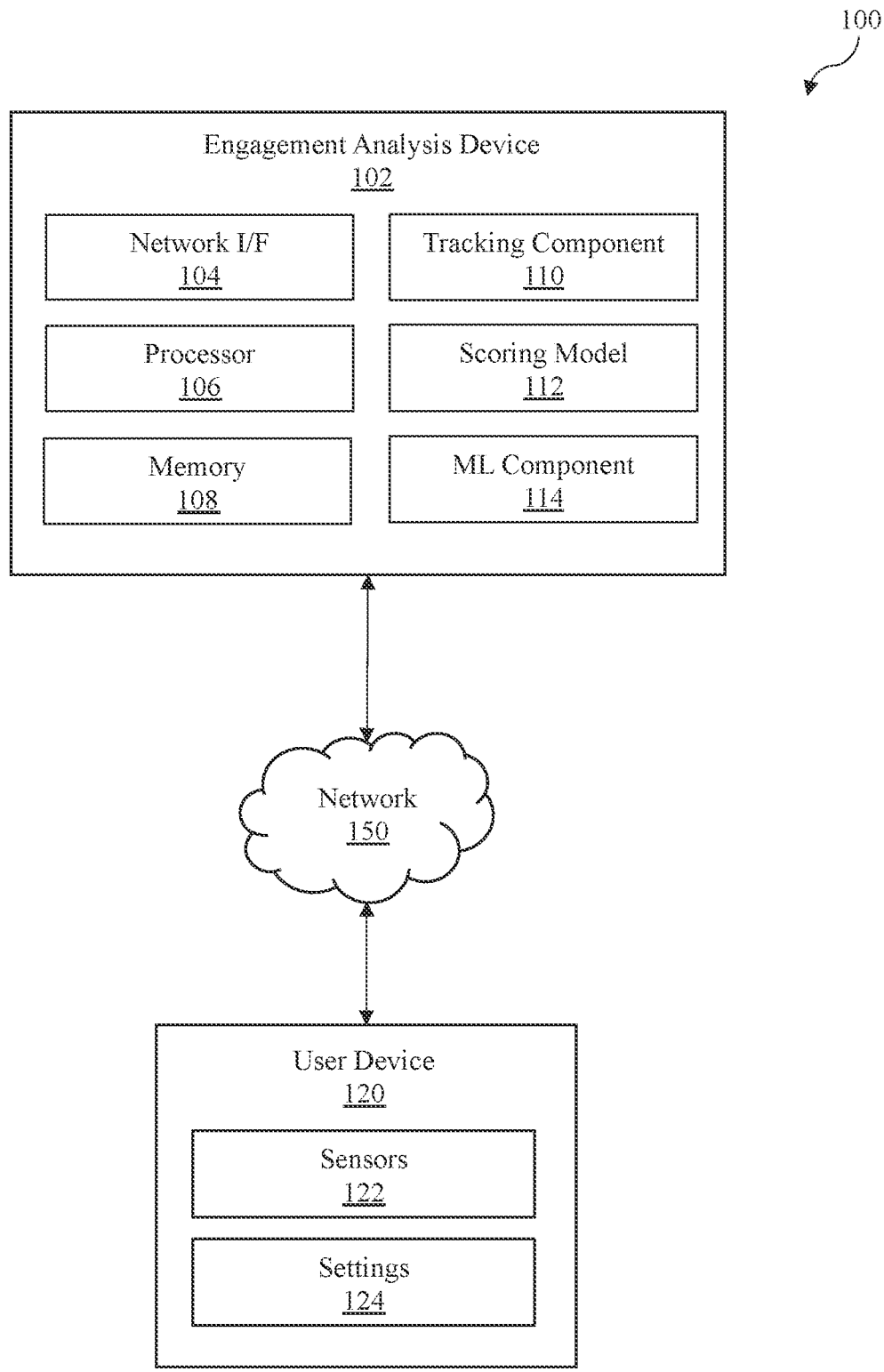
FIG. 1 illustrates a block diagram of an example engagement analysis system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of multimedia playback systems and, more particularly, to assessing user engagement during playback of multimedia content by tracking various audio, visual, and textual metrics to generate a user engagement score. While the present disclosure is not necessarily limited to such applications, various aspects of the disclosure may be appreciated through a discussion of various examples using this context.

Embodiments of the present disclosure provide a system, method, and computer program product for ensuring digital multimedia content (e.g., advertisements, documents, terms & conditions, training videos, etc.) has been adequately viewed by an end user. The system uses existing technologies that generate data that can be collected, analyzed, and augmented to make predictions on user engagement when viewing multimedia content. For instance, front facing cameras, microphones and even light detection and ranging (LIDAR) sensors exist on most new laptops and phones. However, data generated from these types of technologies is not used to determine user engagement with multimedia content being played on a given user device. Using a combination of this generated data, the present disclosure may track user attentiveness and/or comprehension and provide a quantifiably determined user engagement score. Further, additional technologies such as text-to-speech technologies, screen readers, and closed captioning can be used to aide in tracking user engagement in the cases of visual and/or auditory impairment.

In this way, using the engagement score can accurately indicate how closely a user followed along on an instructional video or whether they paid attention to an advertisement and which parts were the most interesting to the user. Using these technologies in a novel combination to generate the engagement score provides a much richer approach to determining user engagement including expression evaluation, system setting analysis related to visual and audio settings, in addition to a user proximity approach. Additionally, the present disclosure does not simply focus on attention, but may include evaluation of content comprehension providing a leading indicator prior to losing attention. Use of expression analysis along with audio analysis provides a significantly more robust analysis of the user engagement and comprehension. Expression analysis provides both an attention/engagement component as well as providing the ability to identify lack of comprehension to enable a real time notification to both the consumer and the presenter allowing for remediation. The audio analysis provides insight on the actual ability for the user to consume the multimedia content and can be used to identify conflicts of interest by capturing background distractions.

In embodiments, the user(s) must opt into the system in order for the system to collect, track, generate, and/or use their information (e.g., tracking engagement metrics, analyzing engagement metrics, generate user engagement scores, generate questions, provide user specific incentives, etc.). As part of the opt-in, the user may approve data tracking and collection in exchange for incentives in response to achieving high engagement scores (e.g., high engagement with advertisements may result in reduced commercial interruption). The user may determine which other users (e.g., third party user or entity, second users, crowdsourced users, etc.) can access the collected, tracked, and/or generated data. For example, during an initialization process, the system may inform the user of the types of data that it will collect (e.g., tracking data, visual image data of the user, audio data associated with the user, etc.) and the reasons why the data is being collected. In these embodiments, the system will only start collecting the user information upon the user explicitly permitting the collection. Furthermore, the system may only collect the data that is necessary to generate the user engagement score and/or related user content (e.g., comprehension questions). The data may be anonymized and/or encrypted while in use, and the data may only be maintained as needed for providing necessary actions. If the user chooses to opt out of the system, any user information previously collected may be permanently deleted.

In embodiments, the system may determine which resources are available for use when assessing user engagement. For example, the system may analyze available sensors that are available for tracking user engagement. Sensors may include one or more light detection and ranging (LIDAR) sensors, microphones, speakers, video/cameras, proximity sensors, motion sensors, and the like. Further the system may determine various software capabilities such as speaker settings, closed captioning, screen reader availability, text-to-speech ability, etc. that are available on the given user device or system that may be used for assessing user engagement. The system may gather and/or determine these capabilities by analyzing various available data (e.g., metadata) from the user device and/or alternative sources (e.g., electronic documents, manuals, specifications, and the like).

In embodiments, the system may present the user with multimedia content for which the system will evaluate user engagement. For example, the system may indicate that the user's engagement will be evaluated while watching a training video or while reading a text of a document. In this way, the user is aware that they are being evaluated for engagement with the given multimedia content (e.g., textual content, audio/visual content, etc.).

In embodiments, the system will activate the required system/user device resources (e.g., video, LIDAR, microphone, etc.) and begin analyzing the system/user device resource readings or generated data while the user is presented with the multimedia content. While the multimedia content is presented to the user, a scoring model will generate scores for the user based on the content specifics. For example, the scoring model may generate an engagement score(s) while the user is presented with audio and video content. Each type of content may be scored based on various metrics. For example, engagement with audio content such as audio based educational content may be scored based on a presence of the user in relation to a distance from the user device presenting the content as shown by video and measured by LIDAR. For example, this distance may be used to determine if the user is with a predetermine threshold distance of the user device, such that they can hear the educational content. In some embodiments, this distance may be combined with speaker settings showing a volume level expected to provide suitable listening.

In some embodiments, the system may utilize the user device's microphone to assess background noise volumes. The system may reduce the user's engagement score if background noise exceeds a predetermined noise threshold, thus indicating that the user may be distracted. For the hearing impaired this audio content would be scored based on presence of speech-to-text and the engagement thereof, using LIDAR and eye tracking. For example, the system may track eye-movement of the user and distance of the user when reading closed captions related to the multimedia content. The engagement score may be increased if eye-tracking data indicates the user is reading the closed caption and reduced if eye-tracking data indicates the user's eyes are focused on areas other than the closed captions or may unlikely be able to read the closed captions from a predetermined distance away from the user device.

In embodiments, the system may analyze user video engagement during playback of video content of the multimedia content. In some embodiments, the system uses image recognition, eye-tracking, and/or facial expression recognition algorithms to extract various features, characteristics, and/or attributes of or associated with the user while the user is observing or presented with the multimedia content to generate the engagement score. The features may include, for example, angles and positioning of certain facial components (e.g., facial expressions, eyes/eyebrows angles or movement, head angle tilt, eye direction relative to a user interface on the user device, etc.), the presence of other objects within proximity of the user that may be distractions (e.g., other users, other multimedia device, etc.) and/or software such as applications playing on the user device subsequently with the presented multimedia content. As would be recognized by one of ordinary skill in the art, other features may be extracted depending on the user and their surroundings, and the examples given herein should not be construed as limiting. The system may determine how the features of the user in the user's current state during multimedia playback compares to historic features (e.g., eye-tracking, facial expressions, etc.) of other users when shown to be engaged/not engaged based on training data. Based on the comparison the system may score the engagement level of the user at a given time during playback. In some embodiments, the system may use eye-tracking software to compare a particular video content the user is actively viewing to the audio content being presented. For example, video content such as advertisements or educational content may be based on audio settings plus use of the camera to eye-track and ensure the user is both hearing and watching specific content presented to the user on screen. For example, in some cases video content may have additional settings indicating whether viewing is important or which subsections are important, such as charts and data versus simply seeing a presenter speaking which may not require high visual engagement. For the cases where the user has a visual or auditory impairment, assistive technologies will also be taken into account where applicable. As would be recognized by one of ordinary skill in the art, other features may be extracted depending on the type of object, and the examples given herein should not be construed as limiting.

In some embodiments, the system may analyze the user video engagement during playback of the video content based on comparing a scroll rate of textual content presented to the user to visual attention of the user to the textual content. For example, textual content such as terms and conditions would be scored on rate of scrolling combined with eye mapping, and in the case of text-to-speech presence use audio levels and ambient sound from the microphone. For example, if the user scrolls quickly through the document, the engagement score may be reduced because it is unlikely that the user actually read the textual content of the document.

In embodiments, the system may generate a user engagement score during the playback of the multimedia content based on a time averaged value for each metric analyzed during playback of the multimedia content (e.g., metrics for evaluating audio content, video content and/or textual content). In some embodiments, the score may be generated over a time period, where the score is continuously generated and plotted on an engagement graph over the time frame of the playback of the multimedia content. In this way, the user's engagement can be assessed at different portions or specific content sections of the multimedia content during media playback. In some embodiments, the system may calculate an overall engagement score for the user. In some embodiments, the engagement score may comprise an engagement percentage that is calculated using the total possible score and how much is lost to measured non-engagement.

In embodiments, explicit scoring models are unique to the system, but the general approach is to provide credit for engagement based on the time averaged value for each of the relevant metrics for the content being consumed. For example, a user listening to audio for 5 minutes would get credits for time present, with a valid volume and no background noise. However, when the user's presence or attention is lost, e.g., the volume is turned down below a predetermined volume threshold, muted, or background noise exceeds a predetermined background noise threshold, then the system would quantify that the user is distracted (perhaps because of a side conversation or consuming an alternative media source simultaneously during playback). The system would then reduce or negate the user's engagement score for that time frame because the user was most like distracted and unable to adequately absorb the audio content.

In embodiments, the system may compare the user engagement score(s) to a predetermined engagement threshold and perform an action if the engagement score is above or below the threshold. For example, the engagement threshold may be associated with an audio or video advertisement that is presented to the user during playback of the multimedia content. The system may determine that the user engagement score during an audio or video advertisement is above a predetermined threshold and, in response, reduce a number of advertisements presented to the user during the playback of the multimedia content and/or reduce a playback time of one or more advertisements presented to the user during the playback of the multimedia content. In some embodiments, the system may determine that the user engagement score during an audio or video advertisement is below a predetermined threshold and, in response to the determining, increase a number of advertisements presented to the user during the playback of the multimedia content and/or increase a playback time of one or more advertisements presented to the user during the playback of the multimedia content.

In this way, the engagement score or percentage may be used in a variety of ways both real time and/or post playback/engagement with the multimedia content. For example, the engagement percentage may be used to provide a user with a benefit like a reduced commercial interruption in streaming due to high engagement or extended commercial interruption with low engagement. In some embodiments, the engagement score of user(s) during streaming programming may also be evaluated allowing for a relative comparison wherein a user or group of users minimally watching the main content won't be disproportionately penalized when they also don't watch the advertisements.

In some embodiments, the engagement score or engagement percentage may be used to tailor various content questions or quizzes related to educational materials to ensure that low engagement did not result in low content absorption. In some embodiments, fewer questions may be presented to the user if the given user has a high engagement score. In this way, users that are determined to be engaged with the multimedia content may not require further assessment, while users that are not engaged during playback of the multimedia content may require assessment. In some embodiments, tracking and engagement/attentiveness rating at more granular levels may allow for dynamically selected questions targeted at areas of low engagement where users that already knew it still pass, but others will be forced to review those areas.

In some embodiments, the system may use a machine learning model to generate the one or more questions designed to assess an understanding of the multimedia content. The machine learning model may dynamically determine and generate questions based on a portion or specific content section of the multimedia content presented during playback in which the user engagement score is below a predetermined threshold over a time range. For example, the machine learning may use natural language processing to analyze the multimedia content (e.g., audio or textual content) to determine what was presented during a time frame when the user was not engaged with the content. Based on the specific content, the machine learning model may tailor a specific question to the content without procedural programming and present it to the user. The machine learning model may determine the appropriate answer to the question based on the context or searching other textual content resources (e.g., information databases) and score the user based on their given answer. If the user cannot answer the question accurately, then their engagement score is reduced.

In some embodiments, the machine learning model is trained using crowdsourced data. For example, the system may collect various training data from a plurality of crowdsourced users to train a machine learning model to improve various algorithms of the system. For example, the system may collect crowdsourced data for historical users that have watched a given multimedia content and improve predictions for providing accurate engagement scores. For example, the system may identify that certain facial expressions and/or eye movements may indicate a user is more or less engaged in the multimedia content than was previously correlated when calculating engagement scores. Using this data, the system may update algorithms on how the scoring model scores these identified movements and/or expressions to improve the scoring model. In another example, the machine learning model may be trained to improve scoring related to audio volume in relation to distance from a given speaker for various groups of users (e.g., based on demographics).

In some embodiments, the system may generate audit records using the engagement score that are used to determine if the user has adequately engaged with mandatory education, reading of terms and conditions, and/or reviewed content that requires that the user has absorbed the material. The records would provide an engagement assessment with the measured values in the criteria as supporting information on the diligence that a user was engaged. Audit records may include scoring related to quizzes or questions presented to the user after being presented with the multimedia content.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an example engagement analysis system 100, in accordance with embodiments of the present disclosure. In the illustrated embodiment, engagement analysis system 100 includes engagement analysis device 102 that is communicatively coupled to user device 120 via network 150. Engagement analysis device 102 and user device 120 may be configured as any type of computer system and may be substantially similar to computer system 401 of FIG. 4. In some embodiments, engagement analysis device 102 and user device 120 may be configured as separate standalone systems that communicate over network 150 or as one or more integrated system. For example, engagement analysis device 102 may be a separate computing device or application that communicates over a cloud computing network with a user's smartphone, laptop, tablet, etc. (e.g., user device 120). In some embodiments, engagement analysis device 102 may be included on user device 120 (e.g., virtualized application on a user interface).

In embodiments, network 150 may be any type of communication network, such as a wireless network or a cloud computing network. Network 150 may be substantially similar to, or the same as, a computing environment 500 described in FIG. 5. In some embodiments, network 150 can be implemented within a cloud computing environment or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over network 150. In some embodiments, network 150 can be implemented using any number of any suitable communications media. For example, the network may be a wide area network (WAN), a local area network (LAN), a personal area network (PAN), an internet, or an intranet. In certain embodiments, the various systems may be local to each other, and communicate via any appropriate local communication medium. For example, engagement analysis device 102 may communicate with user device 140 using a WAN, one or more hardwire connections (e.g., an Ethernet cable), and/or wireless communication networks. In some embodiments, the various systems may be communicatively coupled using a combination of one or more networks and/or one or more local connections. For example, in some embodiments, engagement analysis device 102 may communicate with user device 120 using a hardwired connection, while in some embodiments, communication between user device 120 and engagement analysis device 102 may be through a wireless communication network.

In embodiments, user device 120 may be any type of communication device (e.g., a computer, smartphone, tablet, laptop, etc.) that includes sensors capable of tracking user interaction with multimedia content. In the illustrated embodiment, user device 120 includes sensors 122 and settings 124. Sensors 122 may include any type of sensor configured to track user engagement with multimedia content (e.g., audio, video/visual, and/or textual content). For example, sensors may include cameras, speakers, microphones, LIDAR, proximity sensors, motion detection sensors, and/or eye tracking sensors. It is contemplated that other sensors may be used to track user engagement and this list is not to be limited. In some embodiments, user device 120 may include some or similar components (e.g., processor, memory, network I/F, machine learning component, etc.) as engagement analysis device 102, but for brevity purposes these components are not shown. In some embodiments, additional sensors for tracking may be separate from the user device. For example, Internet of Things (IoT) devices (e.g., smart cameras, smart speakers, smart car, etc.) that include various sensors may be configured to generate user tracking data that may be collected and analyzed by the engagement analysis device 102. Although not shown, these IoT devices may be configured to interacted with user device 120 over network 150. Settings 124 may include any type of software or hardware component settings. For example, settings may include device settings such as various volume settings, display settings, scroll settings, speaker/microphone settings, closed captioning, screen reader availability, text-to-speech settings, and the like.

In the illustrated embodiment, engagement analysis device 102 includes network interface (I/F) 104, processor 106, memory 108, tracking component 110, scoring model 112, and machine learning (ML) component 114.

In embodiments, tracking component 110 is configured to collect and/or track data generated from various sensors 122 to make tracking determinations for the given user. For example, tracking component 110 may utilize distance measurements from a LIDAR sensor to make determinations on whether a user is within a predetermined distance threshold from the user device and/or speaker to be considered engaged with audio content of the presented multimedia content presented to the user. In some embodiments, the tracking component 110 may use eye-tracking, facial expression recognition, feature extraction, and/or image recognition algorithms to track whether the user's facial expressions and/or eyes indicate that the user is engaging with the presented multimedia content that may be displayed to the user via a user interface/display of user device 120. For example, the tracking component 110 may determine from image content of the user, that the user is not engaged with the video content because the user is not looking at the screen and/or the user's eyes (via eye-tracking, or facial expression) are not focused on the displayed content.

In embodiments, scoring model 112 analyzes the tracking data from the tracking component 110 and generates a user engagement score based on multimedia content specifics. For example, the score may be generated based on audio engagement, video engagement, textual engagement, or any combination thereof. For example, engagement with audio content such as audio based educational content may be scored based on a presence of the user in relation to a distance from the user device presenting the content as shown by video and measured by LIDAR. For example, this distance may be used to determine if the user is with a predetermine threshold distance of the user device, such that they can hear the educational content. In some embodiments, this distance may be combined with speaker settings showing a volume level expected to provide suitable listening. In some embodiments, the scoring model 112 may rank and/or score engagement with a given content based on importance of the specific content to observed. For example, audio and/or textual content may be more important for engagement, than video content of a presenter being displayed to the user, and therefore score appropriately (e.g., higher score for engagement with the audio and textual content, unaffected score for lack of engagement with the video).

In embodiments, the scoring model 112 may generate the user engagement score during the playback of the multimedia content based on a time averaged value for each metric analyzed during playback of the multimedia content (e.g., metrics for evaluating audio content, video content and/or textual content). In some embodiments, the score may be generated over a time period, where the score is continuously generated and plotted on an engagement graph over the time frame of the playback of the multimedia content. In this way, the user's engagement can be assessed at different portions or specific content sections of the multimedia content during media playback. In some embodiments, the system may calculate an overall engagement score for the user. In some embodiments, the engagement score may comprise an engagement percentage that is calculated using the total possible score and how much is lost to measured non-engagement. In embodiments, explicit scoring models are unique to the system, but the general approach is to provide credit for engagement based on the time averaged value for each of the relevant metrics for the content being consumed.

In embodiments, machine learning (ML) component 114 may collect, monitor, and/or analyze various data (tracking data, scoring data, metadata, multimedia content, etc.) related to the engagement analysis system 100. Using the various data, the machine learning component 114 or model may generate one or more questions designed to assess an understanding of the multimedia content. The machine learning component 114 may dynamically determine and generate questions based on a portion or specific content section of the multimedia content presented during playback in which the user engagement score is below a predetermined threshold over a time range. For example, the machine learning component 114 may use natural language processing to analyze the multimedia content (e.g., audio or textual content) to determine what was presented during a time frame when the user was not engaged with the content. Based on the specific content, the machine learning component 114 may tailor a specific question to the content without procedural programming and present it to the user. The machine learning component 114 may determine the appropriate answer to the question based on the context or searching other textual content resources (e.g., information databases) and score the user based on their given answer. If the user cannot answer the question accurately, then their engagement score is reduced.

In some embodiments, the machine learning component 114 or model is trained using crowdsourced data. For example, the system may collect various training data from a plurality of crowdsourced users to train a machine learning model to improve various algorithms of the system. For example, the system may collect crowdsourced data for historical users that have watched a given multimedia content and improve predictions for providing accurate engagement scores. For example, the machine learning component 114 may identify that certain facial expressions and/or eye movements may indicate a user is more (or less) engaged in the multimedia content than was previously correlated when calculating engagement scores. Using this data, the machine learning component 114 may update algorithms on how the scoring model scores these identified movements and/or expressions to improve the scoring model. In another example, the machine learning model may be trained to improve scoring related to audio volume in relation to distance from a given speaker for various groups of users (e.g., based on demographics). Using the various crowdsourced data, machine learning component 114 may automatically implement and/or adjust various thresholds (volume, distances, eye-tracking, engagement thresholds). For example, machine learning component 114 may identify from the collected data and/or feedback from users (received via user device 140) that certain engagement thresholds, such as incentive thresholds for playing more/less advertisements are too stringent and need to be reduce. The machine learning component 114 can input this data and adjust the thresholds accordingly. In this way, the machine learning component 114 may use crowdsourcing to improve the quality and accuracy of assessing the engagement of users over time.

In some embodiments, machine learning component 114 can utilize machine learning and/or deep learning, where algorithms or models can be generated by performing supervised, unsupervised, or semi-supervised training. Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

FIG. 1 is intended to depict the representative major components of engagement analysis system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with engagement analysis system 100 may not be present, and the arrangement of components may vary. For example, while FIG. 1 illustrates an example engagement analysis system 100 having a single engagement analysis device 102 and a single user device 120 that are communicatively coupled via a single network 150, suitable network architectures for implementing embodiments of this disclosure may include any number of engagement analysis devices, user devices, and networks. The various models, modules, systems, and components illustrated in FIG. 1 may exist, if at all, across a plurality of engagement analysis devices, user devices, and networks.

Figure 2A:
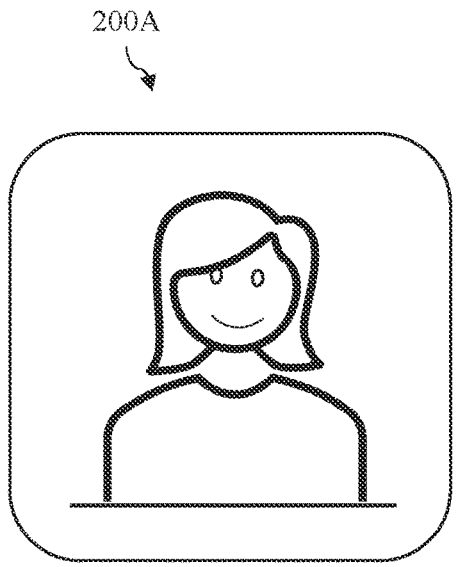
FIG. 2A illustrates an example depiction of an engaged user and accompanying engagement graph during multimedia playback, in accordance with embodiments of the present disclosure.
Figure 2A:
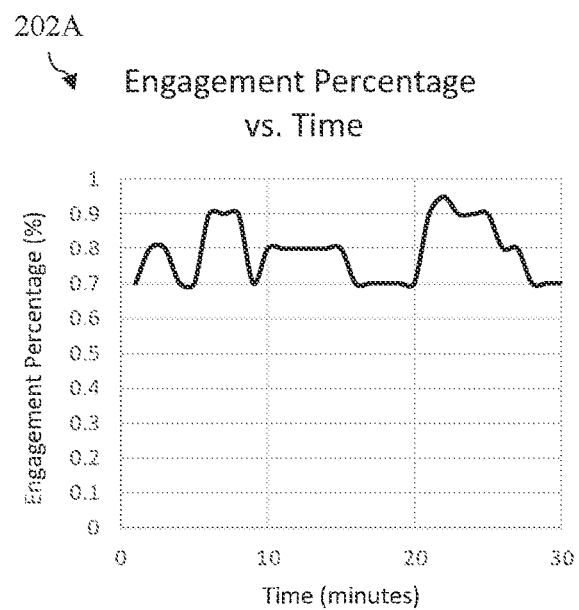

Referring now to FIG. 2A, shown is an example depiction of an engaged user 200A and accompanying engagement graph 202A during multimedia playback, in accordance with embodiments of the present disclosure. In the illustrated embodiment, the engaged user 200A may be observed by a front facing camera (e.g., sensor) that is configured with eye tracking and/or facial expression recognition software. The eye tracking/facial expression recognition software may track the user's eyes and/or facial expression during playback of a given multimedia content to determine if the user is engaged with the material being present. Using the eye tracking metrics and any additional engagement metrics (e.g., audio engagement, distance metrics, textual engagement, facial expression recognition, etc.) the engagement analysis device may generate a user engagement score. In an embodiment, the engagement score is shown as a time average value in the engagement graph 202A. Here, the user's engagement score has been maintained at a value of greater than 70% engagement during the 30-minute length of playback. The engagement score may be compared to a predetermined engagement threshold. For example, if a user is watching a training video, in order to be given credit for viewing the training materials, the predetermined engagement threshold may be set to a threshold value of 60% engagement over the length of the training video. Therefore, the engaged user 200A has met the engagement threshold and would be given credit for observing the training video.

Figure 2B:
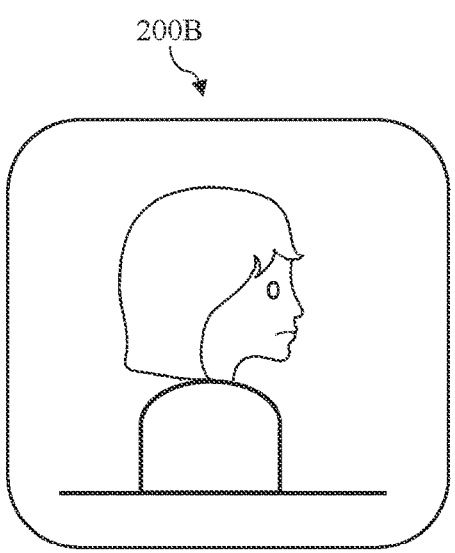
FIG. 2B illustrates an example depiction of a disengaged user and accompanying engagement graph during multimedia playback, in accordance with embodiments of the present disclosure.
Figure 2B:
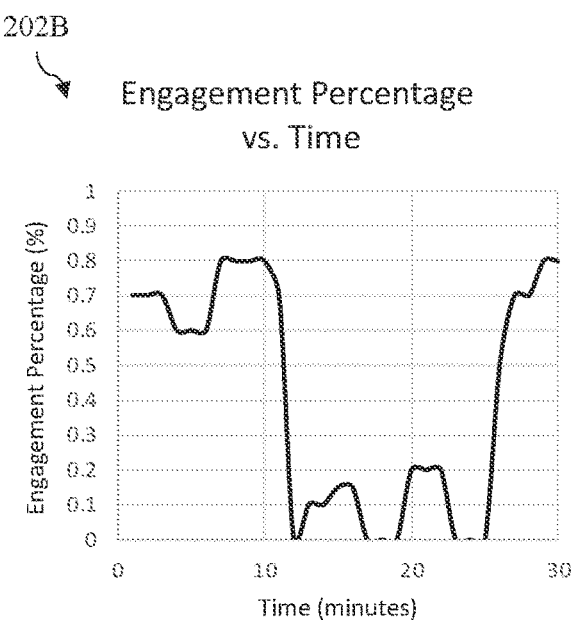

Referring now to FIG. 2B, shown is an example depiction of a disengaged (or not engaged) user 200B and accompanying engagement graph 200B during multimedia playback, in accordance with embodiments of the present disclosure. In the illustrated embodiment, the disengaged user 200B is shown (via a front facing camera) looking to the side and not at the user interface/video screen. Therefore, based on eye tracking, the user engagement score is reduced. As shown in the engagement graph 200B, the disengaged user's engagement score over the 30-minute length of playback has dropped to zero % during various portions of the training video. When comparing the engagement scores from the engagement graph 202B of the disengaged user 200B to the above example engagement threshold of 60% engagement, the disengaged user 200B would not receive credit for the training video.

Figure 3:
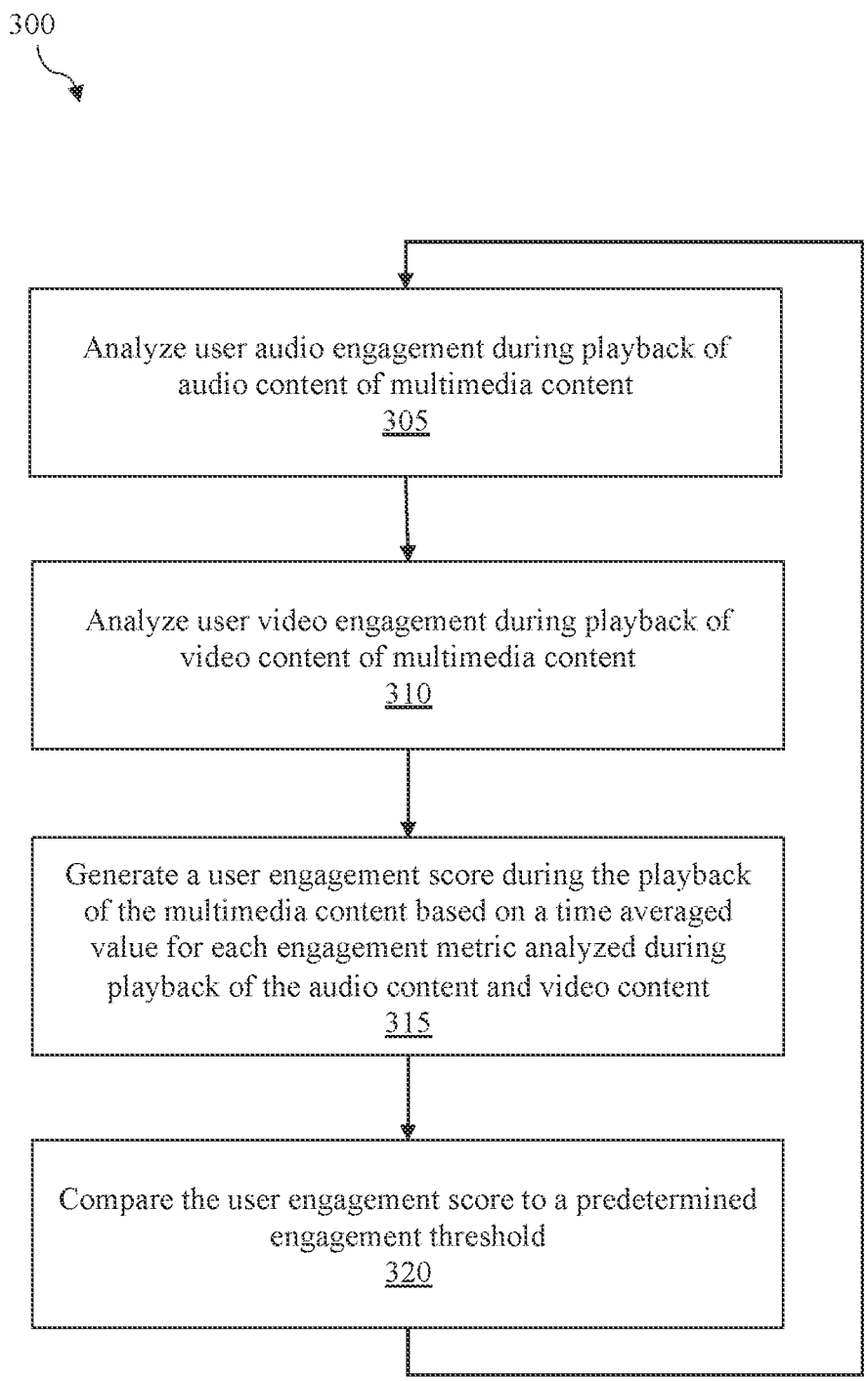
FIG. 3 illustrates a flow diagram of an example process for assessing user engagement during multimedia playback, in accordance with embodiments of the present disclosure.

Referring now to FIG. 3, shown is a flow diagram of an example process 300 for assessing user engagement during multimedia playback, in accordance with embodiments of the present disclosure. The process 300 may be performed by processing logic that comprises hardware (e.g., circuitry, dedicated logic, programmable logic, microcode, etc.), software (e.g., instructions run on a processor), firmware, or a combination thereof. In some embodiments, the process 300 is a computer-implemented process. In embodiments, process 300 may be performed by processor 106 of engagement analysis device 102 of FIG. 1. The process 300 may be performed during playback of multimedia content that is presented to one or more users via a user device (e.g., smartphone, laptop, tablet, computer, etc.). The user device may be configured as user device 120 of FIG. 1.

In embodiments, the engagement analysis device may determine which resources are available for use when assessing user engagement. For example, the engagement analysis device may analyze available sensors that are available for tracking user engagement. Sensors may include one or more LIDAR sensors, microphones, speakers, video/cameras, proximity sensors, motion sensors, and the like. Further the engagement analysis device may determine various software capabilities such as speaker settings, closed captioning, screen reader availability, text-to-speech ability, etc. that are available on the given user device or system that may be used for assessing user engagement. The engagement analysis device may gather and/or determine these capabilities by analyzing various available data (e.g., metadata) from the user device and/or alternative sources (e.g., electronic documents, manuals, specifications, and the like). The engagement analysis device may present the user with multimedia content for which the system will evaluate user engagement. For example, the engagement analysis device may indicate that the user's engagement will be evaluated while watching a training video or while reading a text of a document. In this way, the user is aware that they are being evaluated for engagement with the given multimedia content (e.g., textual content, audio/visual content, etc.). The engagement analysis device will activate the required system/user device resources (e.g., video, LIDAR, microphone, etc.).

In embodiments, once the multimedia content is initiated and presented to the user, the process 300 begins by analyzing user audio engagement during playback of audio content of the multimedia content. This is illustrated at step 305. In embodiments, the analyzing is based, at least in part, on comparing a distance of the user from a speaker transmitting the audio content and comparing the distance of the user from the speaker transmitting the audio content to a volume setting of the speaker. In some embodiments, analyzing the user audio engagement during playback of the audio content is further based on comparing a loudness of the audio content being transmitted from the speaker to a loudness of detected background noise outside of the audio content. In embodiments, the distance may be determined using one or more sensors configured for measuring distances between objects. For example, the distance of the user from the speaker transmitting the audio content may be determined using a LIDAR sensor, however this is not meant to be limiting.

In some embodiments, the engagement analysis device may utilize the user device's microphone to assess background noise volumes. The engagement analysis device may reduce the user's engagement score if background noise exceeds a predetermined noise threshold, thus indicating that the user may be distracted. For the hearing impaired this audio content would be scored based on presence of speech-to-text and the engagement thereof, using LIDAR and eye tracking. For example, the engagement analysis device may track eye-movement of the user and distance of the user when reading closed captions related to the multimedia content. The engagement score may be increased if eye-tracking data indicates the user is reading the closed caption and reduced if eye-tracking data indicates the user's eyes are focused on areas other than the closed captions or may unlikely be able to read the closed captions from a predetermined distance away from the user device.

The process 300 continues by analyzing user video engagement during playback of video content of the multimedia content. This is illustrated at step 310. In embodiments, the analyzing is based, at least in part, on using eye-tracking software to compare a particular video content the user is actively viewing to the audio content being presented. In some embodiments, the engagement analysis device uses image recognition, eye-tracking, and/or facial expression recognition algorithms to extract various features, characteristics, and/or attributes of or associated with the user while the user is observing or presented with the multimedia content to generate the engagement score. The features may include, for example, angles and positioning of certain facial components (e.g., facial expressions, eyes/eyebrows angles or movement, head angle tilt, eye direction relative to a user interface on the user device, etc.), the presence of other objects within proximity of the user that may be distractions (e.g., other users, other multimedia device, etc.) and/or software such as applications playing on the user device subsequently with the presented multimedia content. As would be recognized by one of ordinary skill in the art, other features may be extracted depending on the user and their surroundings, and the examples given herein should not be construed as limiting. The engagement analysis device may determine how the features of the user in the user's current state during multimedia playback compares to historic features (e.g., eye-tracking, facial expressions, etc.) of other users when shown to be engaged/not engaged based on training data. Based on the comparison the engagement analysis device may score the engagement level of the user at a given time during playback.

In some embodiments, the analyzing the user video engagement during playback of the video content is further based on comparing a scroll rate of textual content presented to the user to visual attention of the user to the textual content. For example, textual content such as terms and conditions would be scored on rate of scrolling combined with eye mapping, and in the case of text-to-speech presence use audio levels and ambient sound from the microphone. For example, if the user scrolls quickly through the document, the engagement score may be reduced because it is unlikely that the user actually read the textual content of the document.

The process 300 continues by generating a user engagement score during the playback of the multimedia content based on a time averaged value for each metric analyzed during playback of the audio content and video content. This is illustrated at step 315. For example, the scoring model may generate an engagement score(s) while the user is presented with audio and video content. Each type of content may be scored based on various metrics. For example, engagement with audio content such as audio based educational content may be scored based on a presence of the user in relation to a distance from the user device presenting the content as shown by video and measured by LIDAR. For example, this distance may be used to determine if the user is with a predetermine threshold distance of the user device, such that they can hear the educational content. In some embodiments, this distance may be combined with speaker settings showing a volume level expected to provide suitable listening. In some embodiments, the engagement score may comprise an engagement percentage that is calculated using the total possible score and how much is lost to measured non-engagement. In some embodiments, the user engagement score may be overall score for the entire duration of multimedia playback. In some embodiments, the score may be generated for segmented portions/times of the playback of the multimedia content. In this way, the engagement analysis device may determine which portions of the multimedia content that the user was or was not engaged in based off the individual scoring.

In some embodiments, the engagement analysis device may use eye-tracking software to compare a particular video content the user is actively viewing to the audio content being presented. For example, video content such as advertisements or educational content may be based on audio settings plus use of the camera to eye-track and ensure the user is both hearing and watching specific content presented to the user on screen. For example, in some cases video content may have additional settings indicating whether viewing is important or which subsections are important, such as charts and data versus simply seeing a presenter speaking which may not require high visual engagement. For the cases where the user has a visual or auditory impairment, assistive technologies will also be taken into account where applicable. As would be recognized by one of ordinary skill in the art, other features may be extracted depending on the type of object, and the examples given herein should not be construed as limiting.

The process 300 continues by comparing the user engagement score to a predetermined engagement threshold. This is illustrated at step 320. In some embodiments, the engagement threshold may be associated with an audio or video advertisement that is presented to the user during playback of the multimedia content. For example, the process 300 may continue by determining that the user engagement score during an audio or video advertisement is above a predetermined threshold and, in response to the determining, reducing a number of advertisements presented to the user during the playback of the multimedia content and/or reducing a playback time of one or more advertisements presented to the user during the playback of the multimedia content. In some embodiments, the process 300 may continue by determining that the user engagement score during an audio or video advertisement is below a predetermined threshold and, in response to the determining, increasing a number of advertisements presented to the user during the playback of the multimedia content and/or increasing a playback time of one or more advertisements presented to the user during the playback of the multimedia content.

In this way, the engagement score or percentage may be used in a variety of ways both real time and/or post playback/engagement with the multimedia content. For example, the engagement percentage may be used to provide a user with a benefit like a reduced commercial interruption in streaming due to high engagement or extended commercial interruption with low engagement. In some embodiments, the engagement score of user(s) during streaming programming may also be evaluated allowing for a relative comparison wherein a user or group of users minimally watching the main content won't be disproportionately penalized when they also don't watch the advertisements.

In some embodiments, the engagement score or engagement percentage may be used to tailor various content questions or quizzes related to educational materials to ensure that low engagement did not result in low content absorption. In some embodiments, fewer questions may be presented to the user if the given user has a high engagement score. In this way, users that are determined to be engaged with the multimedia content may not require further assessment, while users that are not engaged during playback of the multimedia content may require assessment. In some embodiments, tracking and engagement/attentiveness rating at more granular levels may allow for dynamically selected questions targeted at areas of low engagement where users that already knew it still pass, but others will be forced to review those areas.

In some embodiments, the process 300 may continue by generating, using a machine learning model, one or more questions designed to assess an understanding of the multimedia content, wherein the one or more questions are based on a portion of the multimedia content presented during playback in which the user engagement score is below a predetermined threshold over a time range. In some embodiments, the machine learning model may use natural language processing to analyze the multimedia content (e.g., audio or textual content) to determine what was presented during a time frame when the user was not engaged with the content. Based on the specific content, the machine learning model may tailor a specific question to the content without procedural programming and present it to the user. The machine learning model may determine the appropriate answer to the question based on the context or searching other textual content resources (e.g., information databases) and score the user based on their given answer. If the user cannot answer the question accurately, then their engagement score is reduced.

In some embodiments, the machine learning model is trained using crowdsourced data. For example, the engagement analysis device may collect various training data from a plurality of crowdsourced users to train a machine learning model to improve various algorithms of the system. For example, the engagement analysis device may collect crowdsourced data for historical users that have watched a given multimedia content and improve predictions for providing accurate engagement scores. For example, the engagement analysis device may identify that certain facial expressions and/or eye movements may indicate a user is more or less engaged in the multimedia content than was previously correlated when calculating engagement scores. Using this data, the engagement analysis device may update algorithms on how the scoring model scores these identified movements and/or expressions to improve the scoring model. In another example, the machine learning model may be trained to improve scoring related to audio volume in relation to distance from a given speaker for various groups of users (e.g., based on demographics).

In some embodiments, the engagement analysis device may generate audit records using the engagement score that are used to determine if the user has adequately engaged with mandatory education, reading of terms and conditions, and/or reviewed content that requires that the user has absorbed the material. The records would provide an engagement assessment with the measured values in the criteria as supporting information on the diligence that a user was engaged. Audit records may include scoring related to quizzes or questions presented to the user after being presented with the multimedia content.

Figure 4:
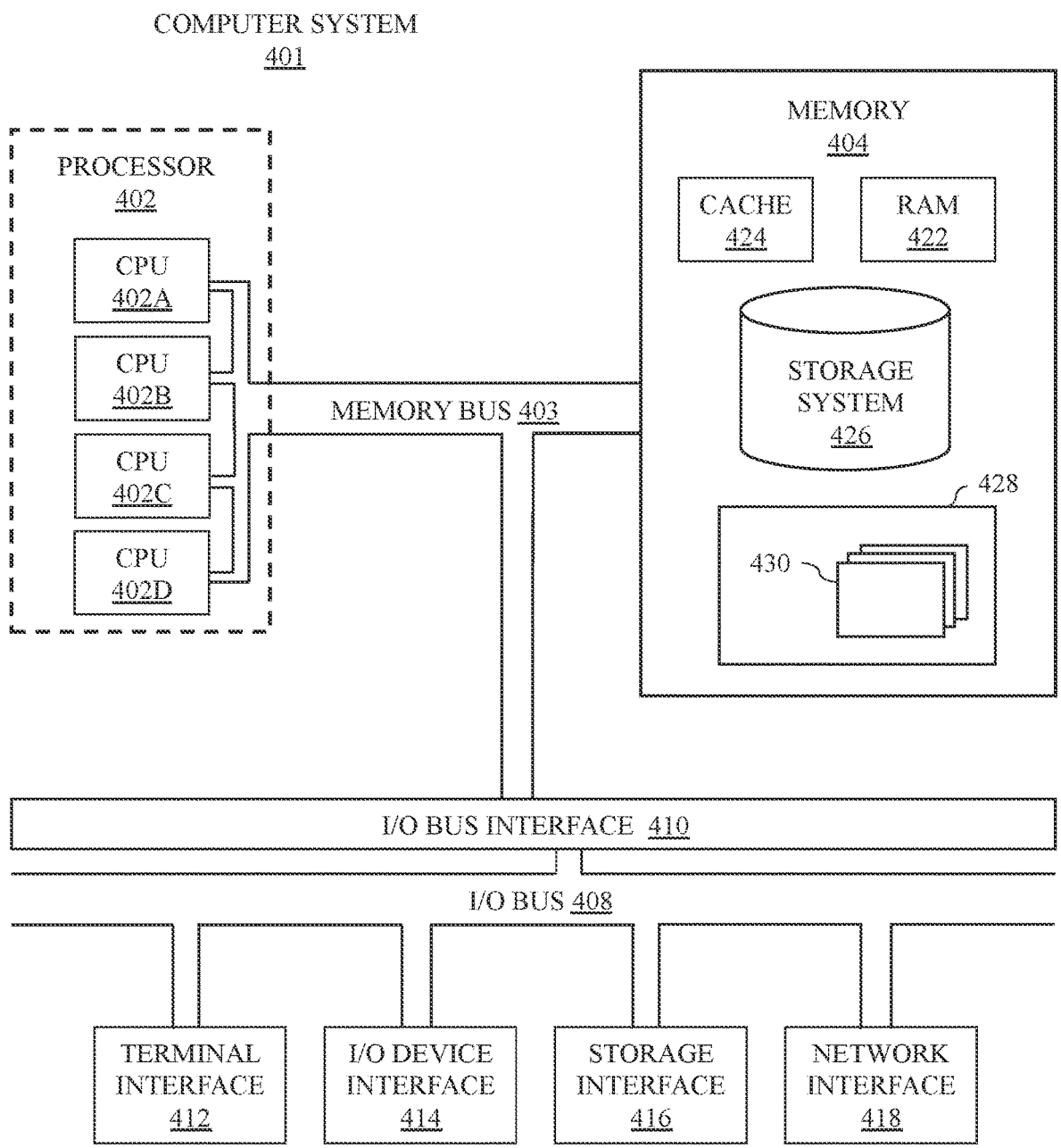
FIG. 4 illustrates a high-level block diagram of an example computer system that may be used in implementing one or more of the methods, tools, and modules, and any related functions, described herein, in accordance with embodiments of the present disclosure.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache. In some embodiments, a processor can include at least one or more of, a memory controller, and/or storage controller. In some embodiments, the CPU can execute the processes included herein (e.g., process 300 as described in FIG. 3). In some embodiments, the computer system 401 may be configured as engagement analysis system 100 of FIG. 1.

System memory subsystem 404 may include computer system readable media in the form of volatile memory, such as random-access memory (RAM) 422 or cache memory 424. Computer system 401 may further include other removable/non-removable, volatile/non-volatile computer system data storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 404 can include flash memory, e.g., a flash memory stick drive or a flash drive. Memory devices can be connected to memory bus 403 by one or more data media interfaces. The memory subsystem 404 may include at least one program product having a set (e.g., at least one) of program modules that are configured to carry out the functions of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single units, the computer system 401 may, in some embodiments, contain multiple I/O bus interfaces 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory subsystem 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 428 and/or program modules 430 generally perform the functions or methodologies of various embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
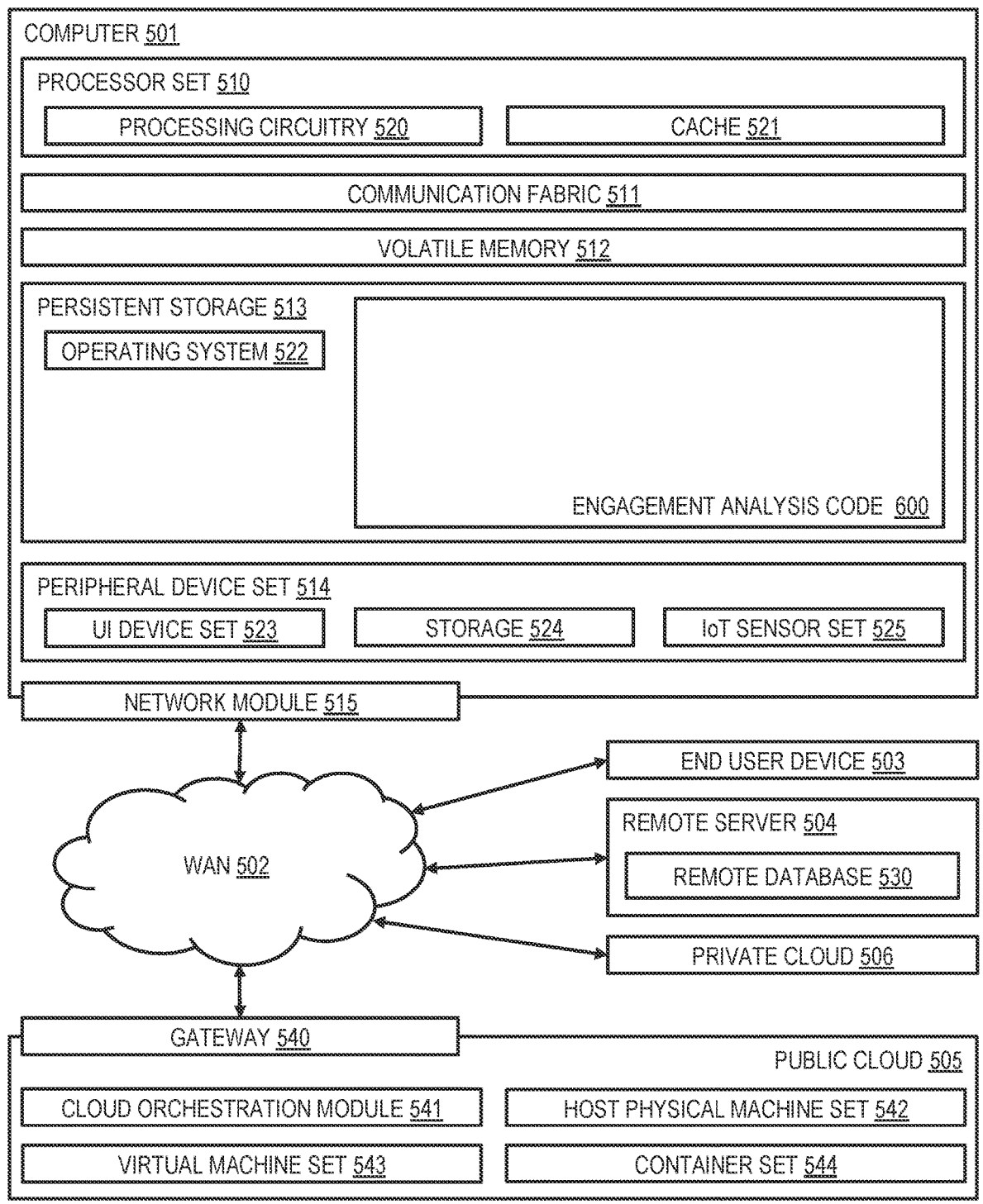
FIG. 5 depicts a schematic diagram of a computing environment for executing program code related to methods for assessing user engagement during multimedia playback disclosed herein, according to at least one embodiment.

Embodiments of the present disclosure may be implemented together with virtually any type of computer, regardless of the platform is suitable for storing and/or executing program code. FIG. 5 shows, as an example, a computing environment 500 (e.g., cloud computing system) suitable for executing program code related to the methods disclosed herein and for circuit design automation. In some embodiments, the computing environment 500 may be the same as or an implementation of the computing environment 100.

Computing environment 500 contains an example of an environment for the execution of at least some of the computer code involved in performing the inventive methods, such as engagement analysis code 600. The engagement analysis code 600 may be a code-based implementation of the engagement analysis system 100. In addition to engagement analysis code 600, computing environment 500 includes, for example, a computer 501, a wide area network (WAN) 502, an end user device (EUD) 503, a remote server 504, a public cloud 505, and a private cloud 506. In this embodiment, the computer 501 includes a processor set 510 (including processing circuitry 520 and a cache 521), a communication fabric 511, a volatile memory 512, a persistent storage 513 (including operating a system 522 and the engagement analysis code 600, as identified above), a peripheral device set 514 (including a user interface (UI) device set 523, storage 524, and an Internet of Things (IoT) sensor set 525), and a network module 515. The remote server 504 includes a remote database 530. The public cloud 505 includes a gateway 540, a cloud orchestration module 541, a host physical machine set 542, a virtual machine set 543, and a container set 544.

The computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as the remote database 530. As is well understood in the art of computer technology, and depending upon the technology, performance of a computer-implemented method may be distributed among multiple computers and/or between multiple locations. On the other hand, in this presentation of the computing environment 500, detailed discussion is focused on a single computer, specifically the computer 501, to keep the presentation as simple as possible. The computer 501 may be located in a cloud, even though it is not shown in a cloud in FIG. 1. On the other hand, the computer 501 is not required to be in a cloud except to any extent as may be affirmatively indicated.

The processor set 510 includes one, or more, computer processors of any type now known or to be developed in the future. The processing circuitry 520 may be distributed over multiple packages, for example, multiple, coordinated integrated circuit chips. The processing circuitry 520 may implement multiple processor threads and/or multiple processor cores. The cache 521 is memory that is located in the processor chip package(s) and is typically used for data or code that should be available for rapid access by the threads or cores running on the processor set 510. Cache memories are typically organized into multiple levels depending upon relative proximity to the processing circuitry. Alternatively, some, or all, of the cache for the processor set may be located "off chip." In some computing environments, the processor set 510 may be designed for working with qubits and performing quantum computing.

Computer readable program instructions are typically loaded onto the computer 501 to cause a series of operational steps to be performed by the processor set 510 of the computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 521 and the other storage media discussed below. The program instructions, and associated data, are accessed by the processor set 510 to control and direct performance of the inventive methods. In the computing environment 500, at least some of the instructions for performing the inventive methods may be stored in the engagement analysis code 600 in the persistent storage 513.

The communication fabric 511 is the signal conduction path that allows the various components of the computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

The volatile memory 512 is any type of volatile memory now known or to be developed in the future. Examples include dynamic type random access memory (RAM) or static type RAM. Typically, the volatile memory 512 is characterized by random access, but this is not required unless affirmatively indicated. In the computer 501, the volatile memory 512 is located in a single package and is internal to the computer 501, but, alternatively or additionally, the volatile memory may be distributed over multiple packages and/or located externally with respect to the computer 501.

The persistent storage 513 is any form of non-volatile storage for computers that is now known or to be developed in the future. The non-volatility of this storage means that the stored data is maintained regardless of whether power is being supplied to the computer 501 and/or directly to the persistent storage 513. The persistent storage 513 may be a read only memory (ROM), but typically at least a portion of the persistent storage allows writing of data, deletion of data and re-writing of data. Some familiar forms of persistent storage include magnetic disks and solid state storage devices. The operating system 522 may take several forms, such as various known proprietary operating systems or open source Portable Operating System Interface-type operating systems that employ a kernel. The code included in the engagement analysis code 600 typically includes at least some of the computer code involved in performing the inventive methods.

The peripheral device set 514 includes the set of peripheral devices of the computer 501. Data communication connections between the peripheral devices and the other components of the computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, the UI device set 523 may include components such as a display screen, speaker, microphone, wearable devices (such as goggles and smart watches), keyboard, mouse, printer, touchpad, game controllers, and haptic devices. The storage 524 is external storage, such as an external hard drive, or insertable storage, such as an SD card. The storage 524 may be persistent and/or volatile. In some embodiments, the storage 524 may take the form of a quantum computing storage device for storing data in the form of qubits. In embodiments where the computer 501 is required to have a large amount of storage (for example, where the computer 501 locally stores and manages a large database) then this storage may be provided by peripheral storage devices designed for storing very large amounts of data, such as a storage area network (SAN) that is shared by multiple, geographically distributed computers. The IoT sensor set 525 is made up of sensors that can be used in Internet of Things applications. For example, one sensor may be a thermometer and another sensor may be a motion detector.

The network module 515 is the collection of computer software, hardware, and firmware that allows the computer 501 to communicate with other computers through the WAN 502. The network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of the network module 515 are performed on the same physical hardware device. In other embodiments (for example, embodiments that utilize software-defined networking (SDN)), the control functions and the forwarding functions of the network module 515 are performed on physically separate devices, such that the control functions manage several different network hardware devices. Computer readable program instructions for performing the inventive methods can typically be downloaded to the computer 501 from an external computer or external storage device through a network adapter card or network interface included in the network module 515.

The WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

The end user device (EUD) 503 is any computer system that is used and controlled by an end user (for example, a customer of an enterprise that operates the computer 501), and may take any of the forms discussed above in connection with the computer 501. The EUD 503 typically receives helpful and useful data from the operations of the computer 501. For example, in a hypothetical case where the computer 501 is designed to provide a recommendation to an end user, this recommendation would typically be communicated from the network module 515 of the computer 501 through the WAN 502 to the EUD 503. In this way, the EUD 503 can display, or otherwise present, the recommendation to an end user. In some embodiments, the EUD 503 may be a client device, such as thin client, heavy client, mainframe computer, desktop computer and so on.

The remote server 504 is any computer system that serves at least some data and/or functionality to the computer 501. The remote server 504 may be controlled and used by the same entity that operates computer 501. The remote server 504 represents the machine(s) that collect and store helpful and useful data for use by other computers, such as the computer 501. For example, in a hypothetical case where the computer 501 is designed and programmed to provide a recommendation based on historical data, then this historical data may be provided to the computer 501 from the remote database 530 of the remote server 504.

The public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of the public cloud 505 is performed by the computer hardware and/or software of the cloud orchestration module 541. The computing resources provided by the public cloud 505 are typically implemented by virtual computing environments that run on various computers making up the computers of the host physical machine set 542, which is the universe of physical computers in and/or available to the public cloud 505. The virtual computing environments (VCEs) typically take the form of virtual machines from the virtual machine set 543 and/or containers from the container set 544. It is understood that these VCEs may be stored as images and may be transferred among and between the various physical machine hosts, either as images or after instantiation of the VCE. The cloud orchestration module 541 manages the transfer and storage of images, deploys new instantiations of VCEs and manages active instantiations of VCE deployments. The gateway 540 is the collection of computer software, hardware, and firmware that allows the public cloud 505 to communicate through the WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 506 is similar to the public cloud 505, except that the computing resources are only available for use by a single enterprise. While the private cloud 506 is depicted as being in communication with the WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 505 and the private cloud 506 are both part of a larger hybrid cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. In some embodiments, one or more of the operating system 522 and the engagement analysis code 600 may be implemented as service models. The service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for assessing user engagement during playback of multimedia content comprising:
    analyzing user audio engagement during playback of audio content of the multimedia content, wherein the analyzing is based, at least in part, on comparing a distance of the user from a speaker transmitting the audio content and comparing the distance of the user from the speaker transmitting the audio content to a volume setting of the speaker;
    analyzing user video engagement during playback of video content of the multimedia content, wherein the analyzing is based, at least in part, on using eye-tracking software to compare a particular video content the user is actively viewing to the audio content being presented; and
    generating a user engagement score during the playback of the multimedia content based on a time averaged value for each metric analyzed during playback of the audio content and video content.

2. The computer-implemented method of claim 1, wherein analyzing the user video engagement during playback of the video content is further based on comparing a scroll rate of textual content presented to the user to visual attention of the user to the textual content.

3. The computer-implemented method of claim 1, wherein analyzing the user audio engagement during playback of the audio content is further based on comparing a loudness of the audio content being transmitted from the speaker to a loudness of detected background noise outside of the audio content.

4. The computer-implemented method of claim 1, further comprising:
    determining that the user engagement score during an audio or video advertisement is above a predetermined threshold; and
    in response to the determining, reducing a number of advertisements presented to the user during the playback of the multimedia content and/or reducing a playback time of one or more advertisements presented to the user during the playback of the multimedia content.

5. The computer-implemented method of claim 1, further comprising:
    determining that the user engagement score during an audio or video advertisement is below a predetermined threshold; and
    in response to the determining, increasing a number of advertisements presented to the user during the playback of the multimedia content and/or increasing a playback time of one or more advertisements presented to the user during the playback of the multimedia content.

6. The computer-implemented method of claim 1, wherein the distance of the user from the speaker transmitting the audio content is determined using a light detection and ranging (LIDAR) sensor.

7. The computer-implemented method of claim 1, further comprising:
generating, using a machine learning model, one or more questions designed to assess an understanding of the multimedia content, wherein the one or more questions are based on a portion of the multimedia content presented during playback in which the user engagement score is below a predetermined threshold over a time range.

8. The computer-implemented method of claim 7, wherein the machine learning model is trained using crowd-sourced data.

9. A system comprising:
a processor; and
a computer-readable storage medium communicatively coupled to the processor and storing program instructions which, when executed by the processor, cause the processor to perform a method for assessing user engagement during playback of multimedia content comprising:
analyzing user audio engagement during playback of audio content of the multimedia content, wherein the analyzing is based, at least in part, on comparing a distance of the user from a speaker transmitting the audio content and comparing the distance of the user from the speaker transmitting the audio content to a volume setting of the speaker;
analyzing user video engagement during playback of video content of the multimedia content, wherein the analyzing is based, at least in part, on using eye-tracking software to compare a particular video content the user is actively viewing to the audio content being presented; and
generating a user engagement score during the playback of the multimedia content based on a time averaged value for each metric analyzed during playback of the audio content and video content.

10. The system of claim 9, wherein analyzing the user video engagement during playback of the video content is further based on comparing a scroll rate of textual content presented to the user to visual attention of the user to the textual content.

11. The system of claim 9, wherein analyzing the user audio engagement during playback of the audio content is further based on comparing a loudness of the audio content being transmitted from the speaker to a loudness of detected background noise outside of the audio content.

12. The system of claim 9, wherein the method performed by the processor further comprises:
determining that the user engagement score during an audio or video advertisement is above a predetermined threshold; and
in response to the determining, reducing a number of advertisements presented to the user during the playback of the multimedia content and/or reducing a playback time of one or more advertisements presented to the user during the playback of the multimedia content.

13. The system of claim 9, wherein the method performed by the processor further comprises:
determining that the user engagement score during an audio or video advertisement is below a predetermined threshold; and
in response to the determining, increasing a number of advertisements presented to the user during the playback of the multimedia content and/or increasing a playback time of one or more advertisements presented to the user during the playback of the multimedia content.

14. The system of claim 9, wherein the distance of the user from the speaker transmitting the audio content is determined using a light detection and ranging (LIDAR) sensor.

15. A computer program product comprising a computer-readable storage medium having program instructions embodied therewith, the program instructions executable by a processor to cause the processor to perform a method for assessing user engagement during playback of multimedia content comprising:
analyzing user audio engagement during playback of audio content of the multimedia content, wherein the analyzing is based, at least in part, on comparing a distance of the user from a speaker transmitting the audio content and comparing the distance of the user from the speaker transmitting the audio content to a volume setting of the speaker;
analyzing user video engagement during playback of video content of the multimedia content, wherein the analyzing is based, at least in part, on using eye-tracking software to compare a particular video content the user is actively viewing to the audio content being presented; and
generating a user engagement score during the playback of the multimedia content based on a time averaged value for each metric analyzed during playback of the audio content and video content.

16. The computer program product of claim 15, wherein analyzing the user video engagement during playback of the video content is further based on comparing a scroll rate of textual content presented to the user to visual attention of the user to the textual content.

17. The computer program product of claim 15, wherein analyzing the user audio engagement during playback of the audio content is further based on comparing a loudness of the audio content being transmitted from the speaker to a loudness of detected background noise outside of the audio content.

18. The computer program product of claim 15, wherein the method performed by the processor further comprises:
determining that the user engagement score during an audio or video advertisement is above a predetermined threshold; and
in response to the determining, reducing a number of advertisements presented to the user during the playback of the multimedia content and/or reducing a playback time of one or more advertisements presented to the user during the playback of the multimedia content.

19. The computer program product of claim 15, wherein the method performed by the processor further comprises:
determining that the user engagement score during an audio or video advertisement is below a predetermined threshold; and
in response to the determining, increasing a number of advertisements presented to the user during the playback of the multimedia content and/or increasing a playback time of one or more advertisements presented to the user during the playback of the multimedia content.

20. The computer program product of claim 15, wherein the distance of the user from the speaker transmitting the audio content is determined using a light detection and ranging (LIDAR) sensor.

* * * * *